Feb. 5, 1924.
A. J. CASALE ET AL
REAR AXLE CONSTRUCTION
Filed Dec. 4, 1920
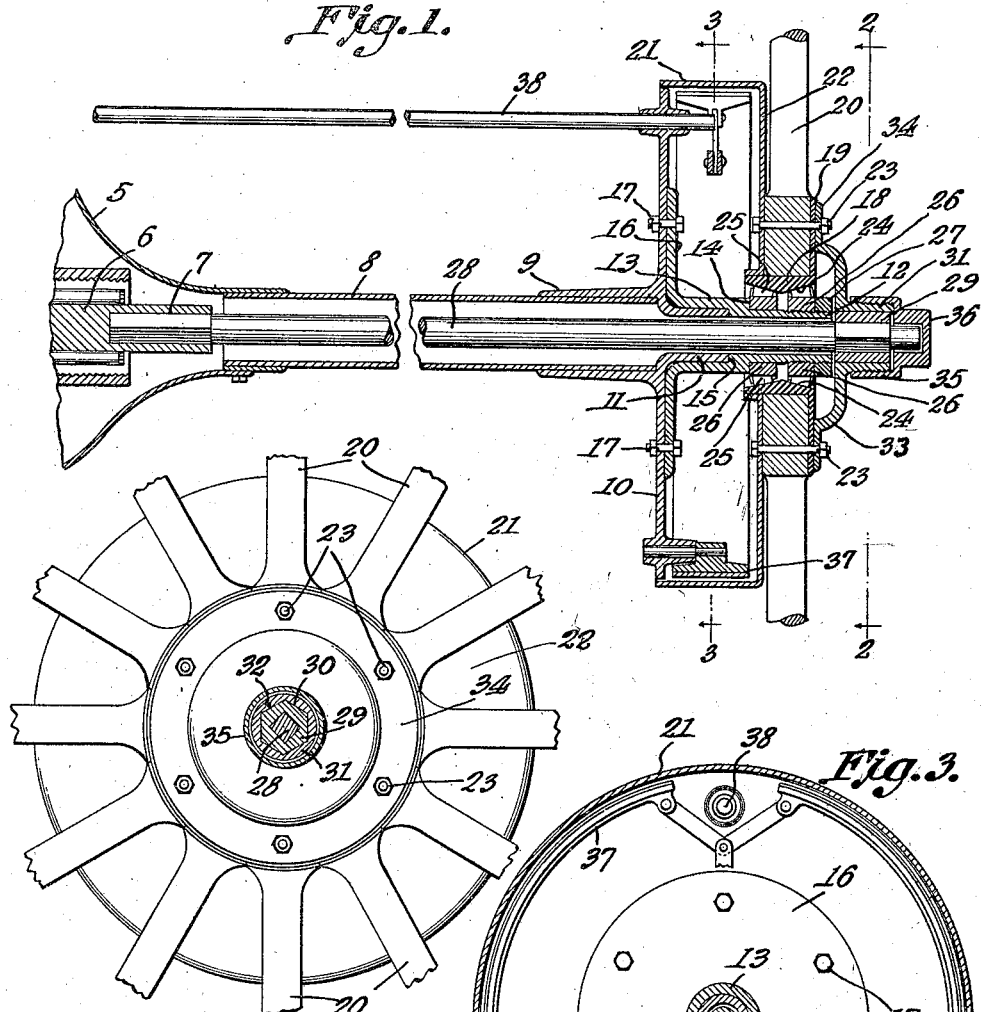
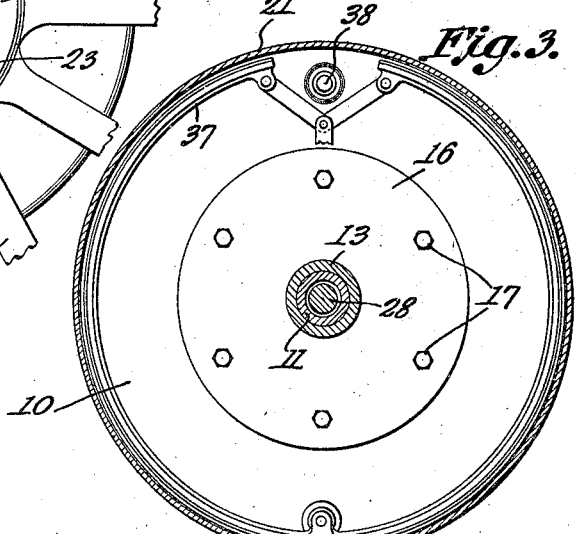
Inventors
Antonio J. Casale and
Joseph B. Simpson
By David Pelton Moore.
Attorney Patented Feb. 5, 1924.

1,482,838

UNITED STATES PATENT OFFICE.

ANTONIO J. CASALE AND JOSEPH B. SIMPSON, OF TAKOMA PARK, DISTRICT OF COLUMBIA, ASSIGNORS TO NATIONAL DIFFERENTIAL MANUFACTURING COMPANY, A CORPORATION OF DELAWARE.

REAR-AXLE CONSTRUCTION.

Application filed December 4, 1920. Serial No. 428,277.

*To all whom it may concern:*

Be it known that we, ANTONIO J. CASALE and JOSEPH B. SIMPSON, citizens of the United States, residing at Takoma Park, in the city of Washington and District of Columbia, have invented certain new and useful Improvements in Rear-Axle Constructions, of which the following is a specification, reference being had therein to the accompanying drawing.

Our invention relates to rear axle constructions for automobiles or like vehicles.

An important object of the invention is to provide a rear axle of the full floating type, embodying few and simple parts, and so constructed that the axle section or sections may be removed without removing or disturbing the wheel or wheels, whereby the automobile may be towed upon the wheels, in the event that the axle section should break and be removed, or the differential should become deranged.

A further object of the invention is to provide a device of the above mentioned character which is adapted to serve as an attachment, to be readily installed upon the rear axle construction of the ordinary automobile, without materially altering the same.

A further object of the invention is to provide simple and strong coupling means for connecting the axle section with the hub of the wheel.

A further object of the invention is to provide a device of the above mentioned character, the parts of which are arranged in a compact manner, and entirely enclosed and thereby protected.

Other objects and advantages of the invention will be apparent during the course of the following description.

In the accompanying drawings forming a part of this specification and in which like numerals are employed to designate like parts throughout the same, Figure 1 is a central longitudinal section through a rear axle construction embodying the invention.

Figure 2 is a transverse section taken on line 2—2 of Figure 1, and,

Figure 3 is a similar view taken on line 3—3 of Figure 1.

In the drawings, wherein for the purpose of illustration, is shown a preferred embodiment of our invention, the numeral 5 designates a differential housing, enclosing a differential gear of any well known or preferred type. This differential gear embodies a coupling shaft 6, which is rotatable, and has a longitudinal opening or recess 7, polygonal in cross section. Secured to each side of the housing 5 is a tubular casing 8, extending outwardly, and projecting into a sleeve 9, which can be rigidly secured thereto by any suitable means, such as by brazing. The sleeve 9 carries a main disk 10, provided centrally with a tube 11, concentric with the sleeve 9, but having a smaller diameter.

The numeral 12 designates a tubular spindle having a rear enlarged portion 13 and shoulders 14 and 15. The enlarged portion 13 of the tubular spindle receives the tube 11 and the enlarged portion carries a radial annular flange 16, adapted to be secured to the disk 10 by bolts 17 or the like.

The numeral 18 designates the tubular hub of the wheel, provided upon its outer side with a hub flange 19, engaging spokes 20. Surrounding the disk 10 is the usual brake drum 21, embodying the side portion 22, having an opening to receive the hub 18, arranged upon the inner side of the spoke 20, and secured to the spokes and hub flange 19, by bolts 23 or the like. The tubular hub 18 is provided with interiorly inclined faces 24, diverging in opposite directions, and engaging preferably tapered roller bearings 25, engaging the bearing rings or race ways 26, fitted upon the exterior of the tubular spindle 12. The outer race way 26, preferably has screw threaded engagement with the tubular spindle, and after being adjusted thereon, is locked against displacement by a nut 27.

Extending longitudinally through each tubular casing 8 is an axle section 28 preferably square in cross section, having its inner end adapted to be inserted within and removed from the opening 7, while its outer end slidably receives a coupling or bushing 29, Figure 2, having an inner opening, square in cross section, and a polygonal exterior surface 30. This coupling or bushing is adapted for insertion within and removed from a tubular portion 31, having a bore 32, Figure 2, polygonal in cross section. This tubular portion is carried by a hub combined coupling element and cap 33, having a radial flange 34, having openings for receiving the bolts 23. The tubular portion 31 is exteriorly screw threaded for receiving a cap 35, having a reduced extension 36, the exterior of which is preferably formed polygonal, for engagement with a wrench or other suitable tool, whereby it may be removed.

The tubular casing 8 carrying the disk 10, is relatively stationary, and is connected with the spring mounting of the vehicle in the usual manner. The brake drum 21 may be engaged by any suitable brake device, and for the purpose of illustration we have shown an internal expanding brake 37, arranged therein and operated by a rock shaft 38. The brake drum may also be engaged by an exterior brake band, of any common design.

In use, should the axle section 28 break or the differential break or become deranged, the cap 36 is removed, without disturbing the other elements of the wheel, and the axle section 28 withdrawn longitudinally from within the tubular casing 8, the coupling or bushing 29 being withdrawn with the axle section. It is thus seen that the wheel will remain upon the tubular spindle 12 and be free to rotate, for supporting the automobile, when it is being towed or the like.

It is also obvious that the construction of the device is such that it may be readily installed upon automobiles of the usual construction. The device is in the nature of an attachment. The disk 10 and a tube 11 are present in the ordinary construction, and in applying the invention to the ordinary automobile, the usual sleeve extending into tube 11 is removed. The tubular spindle 12, included in the attachment, has its enlarged portion 13 inserted over the tube 11 and bolted to the disk 10. The drum 21, and brake 37 are of the ordinary construction, but the other elements are embodied in the attachment.

It is to be understood that the form of our invention herein shown and described is to be taken as the preferred example of the same and various changes in the shape, size, and arrangement of parts may be resorted to, without departing from the spirit of our invention or the scope of the subjoined claims.

Having thus described our invention, what we claim is:

1. In a rear axle construction, a tubular spindle having a portion adapted for insertion upon the tubular extension of a disk, means to hold the spindle upon the extension, a wheel embodying a tubular hub mounted upon the tubular spindle, a hub coupling embodying a cap portion secured to the hub and a tubular portion having a bore which is polygonal in cross section, a bushing removable within said bore and having its exterior polygonal in cross section and having a bore which is polygonal in cross section, a cap detachably engaging the tubular portion of the hub coupling, and an axle section extending through the tubular spindle and through the bore of the bushing.

2. In a rear axle construction, a tubular spindle adapted for connection with the axle housing, a wheel embodying a tubular hub rotatable upon the tubular spindle, a hub coupling secured to the hub and having a tubular portion provided with a bore which is polygonal in cross section, a bushing having an exterior polygonal in cross section for insertion within the bore of said tubular portion, said bushing having a bore polygonal in cross section, an axle section extending through the tubular spindle and having a portion polygonal in cross section for insertion within the bore of the bushing, and a cap carried by the tubular portion of the hub coupling.

3. In a rear axle construction, a tubular spindle, a tubular hub rotatable upon the tubular spindle, a hub coupling permanently secured to the hub and having a tubular portion, an axle section extending through the tubular spindle and tubular portion, means for connecting the axle section and tubular portion to permit of the rotation of the tubular portion by axle section and to permit of the longitudinal removal of the axle section without removing the hub coupling from the wheel, and a cap carried by said tubular portion.

In testimony whereof we affix our signatures in presence of two witnesses.

ANTONIO J. CASALE.
JOSEPH B. SIMPSON.

Witnesses:
FREDERICK A. GENAU,
ULRIC T. MENGERT.